Figure 1:
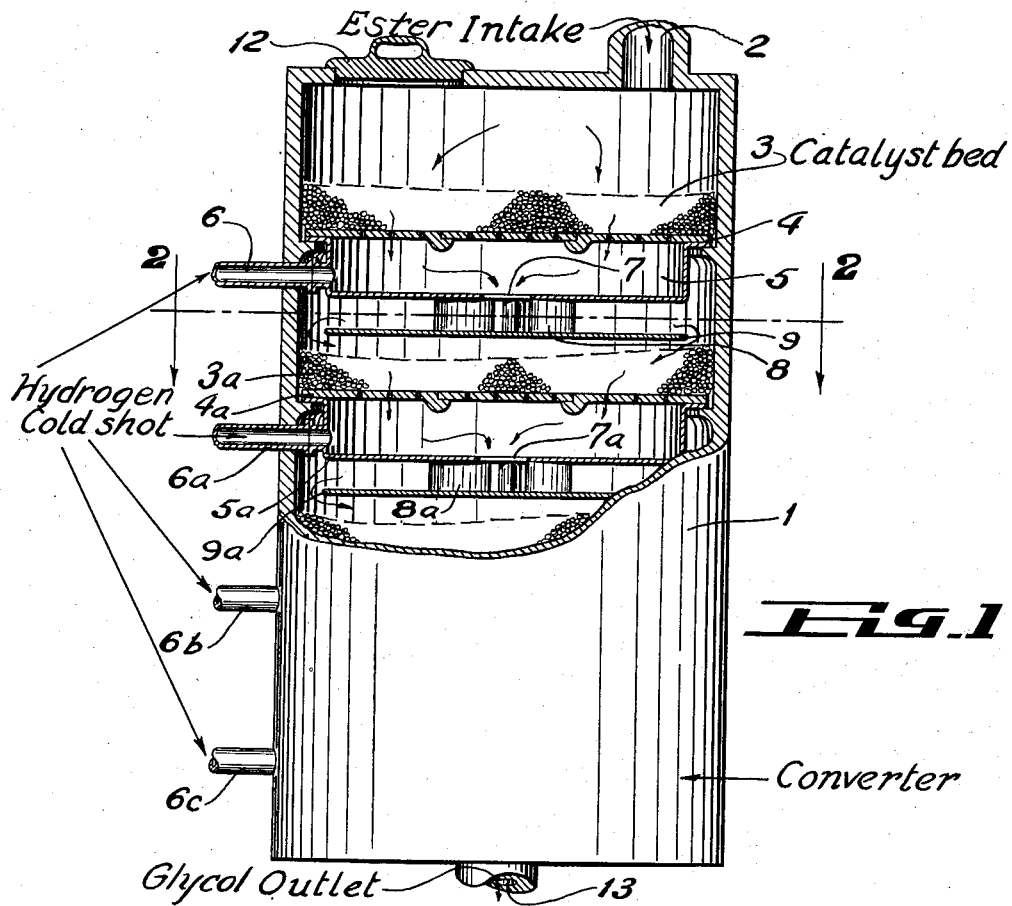

Dec. 15, 1942.   F. W. PARDEE, JR   2,305,104
HYDROGENATION OF ALKYL GLYCOLATES
Filed Oct. 25, 1939

INVENTOR
Fred W. Pardee Jr.
BY
ATTORNEY

Patented Dec. 15, 1942

2,305,104

UNITED STATES PATENT OFFICE 2,305,104

HYDROGENATION OF ALKYL GLYCOLATES

Fred W. Pardee, Jr., Wilmington, Del., assignor to E. I. du Pont de Nemours & Company, Wilmington, Del., a corporation of Delaware Application October 25, 1939, Serial No. 301,190

11 Claims. (Cl. 260—635)

This invention relates to a process for the hydrogenation of organic compounds and, more particularly, to the hydrogenation of hydroxy acetic acid and its derivatives to ethylene glycol.

Vapor phase hydrogenation processes are usually conducted by passing the compound to be hydrogenated, together with hydrogen, over a hydrogenation catalyst disposed in a suitable conversion apparatus. Reactions of this type are generally highly exothermic and, accordingly, in order to control the reaction within the most optimum temperature range, some means must be provided for the removal of the heat of reaction. Moreover, hydrogenation catalysts, necessary for accelerating these reactions, tend rapidly to lose their activity, either due to hot spots resulting from non-uniform removal of the exothermic heat, from catalyst poisons entering with the hydrogen or the compound being hydrogenated, from by-products of the reaction or from a combination of these or other causes. Operating difficulties of this nature are inherent especially in the hydrogenation of hydroxy acetic acid and its derivatives to ethylene glycol. As a result of these difficulties various hydrogenation converters for the vapor phase hydrogenation of organic compounds, other than hydroxy acetic acid and its derivatives have been proposed, but none of them provides conditions under which these difficulties can be wholly eliminated.

An object of the present invention is to provide an improved process for the hydrogenation of organic compounds and, more particularly, for the hydrogenation of alkyl hydroxy acetates to ethylene glycol. Another object of the invention is to provide an apparatus wherein hydrogenations can be conducted and the heat resulting from the exothermicity of the reactions efficiently removed. Yet another object of the invention is to provide a process wherein organic compounds are hydrogenated in the vapor phase, the temperature of the hydrogenation controlled and other benefits realized by the progressive introduction of hydrogen into the catalyst bed. A further object of the invention is to provide operating conditions for such hydrogenation reactions, and particularly for the hydrogenation of the esters of hydroxy acetic acid to ethylene glycol, wherein catalyst degradation is reduced to a minimum. Other objects and advantages of the invention will hereinafter appear.

Figure 2:
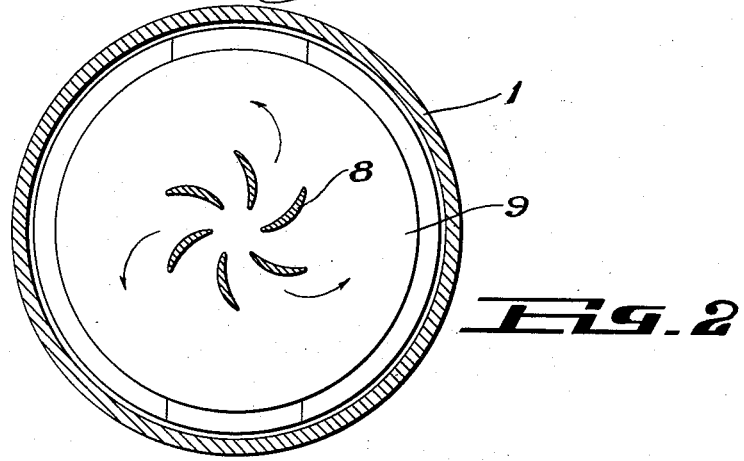

The above and other objects of the invention, which will be more fully particularized hereinafter, are realized by conducting the vapor phase hydrogenation in accord with the process which will be more readily understood by reference to the following specification and the accompanying drawing, in which like parts are indicated by like reference characteristics throughout and in which:

Figure 1 illustrates an elevation of a preferred form of the apparatus with a cutaway portion showing a vertical cross section thereof, which apparatus is adapted to the practice of the invention, and Figure 2, which is a cross section in a horizontal plane taken through the converter shown in Figure 1, at the line 2—2.

Figure 1 illustrates a preferred form of apparatus within which the process of the invention may be carried out. A converter shell 1 of sufficient strength to withstand elevated pressures is provided with an inlet 2 in the upper portion thereof through which the organic compound to be hydrogenated, for example, methyl hydroxy acetate, together with a portion of the hydrogen used, are injected, the organic compound being preferably in the vapor phase. The mixture of gases passes downwardly into the converter and into direct contact with the catalyst bed 3, through this bed 3 and the porous catalyst supporting plate 4 into a mixing chamber 5. Into this chamber there is injected through inlet 6 an added inert gas and/or hydrogen, which is relatively cool as compared with this partially reacted gaseous mixture or may be at any other desired temperature, the inlet 6 directing the added gas toward the center of the chamber or in a tangential direction, as desired. The hydrogen and/or inert gas entering through inlet 6 may be heated or cooled in order that the resulting mixture of gases in chamber 5 is maintained at the desired temperature. The thus fortified and temperature conditioned gases then proceed downwardly through the opening 7 from the chamber 5, against the stationary turbine blades 8. As the gases flow around these blades 8 they are impelled in a circulatory direction, thus causing a turbulence which thoroughly mixes the constituents present in the gas. The mixed gas passes outwardly, in a circuitous path, because of the impulse imparted thereto by the turbine blades 8 over the edge of the deflection plate 9 and into the catalyst bed 3a, from which the gas proceeds through another section of the apparatus similar to the first containing a catalyst bed 3a, catalyst supporting plate 4a, mixing chamber 5a, and turbine-blades 8a and over another deflection plate 9a. Auxiliary hydrogen and/or inert gas is introduced through the inlet 6a. As illustrated the converters contain four sections, although a greater or lesser number may be used. The gases pass through each section in the manner already described and issue from the converter through the conduit 13. It will be appreciated that not only can hydrogen be injected through inlets 6, 6a, etc., which, by the way, may be disposed as shown or in any other desired position, but it may also be found advantageous to inject a portion of, or all of, the compound to be hydrogenated with or without hydrogen or an inert gas or other gas which contributes to the desired reaction through one or more of these inlets whereby reaction temperature, catalyst decomposition and/or yields may be closely controlled.

Figure 2 is a cross section of the converter taken in a horizontal plane which is indicated in Figure 1 at 2—2. It will be noted that the gas, as it contacts the stationary turbine blades 8 is impelled in the directions indicated by the arrows. This causes a turbulent flow of the gas and, as a result, further aids their thorough mixing. Other means, such as baffles, weirs, etc., may be provided if desired in addition to or in lieu of the turbine blade 8.

Since vapor phase hydrogenation of organic compounds is generally conducted under pressure in excess of atmospheric the converter must be able to withstand these pressures and, in addition, as they are of considerable size, it is usually advisable to provide a manhole 12 as small as practical in order to cut down the possibility of leaks. Since catalysts lose their activity after extended use, it is necessary to remove them periodically from the converters and, accordingly, means must be provided for ready removal of the catalyst, as well as the catalyst supporting plates 4, the chamber 5, turbine blades 8 and deflecting plate 9. Applicant has accordingly constructed these plates and chambers in three sections which are readily assembled after insertion through the manhole 12 or disassembled prior to removal therethrough. Figures 1 and 2 illustrate one simple manner of providing sectional plates and sectional chambers which are removable; any suitable division may, of course, be provided.

To illustrate more specifically a preferred operation of the above converter, it will now be described with reference to the hydrogenation of methyl hydroxy acetate to ethylene glycol.

A catalyst is prepared from an aqueous solution containing approximately 10% of the following salts present in the ratio of 1 mole of copper nitrate, 1 mole of zinc nitrate and 3 moles of ammonium chromate, from which aqueous solution the metals are co-precipitated with ammonia. The ammonia is added until the mixture is neutral and the precipitate is then filtered, washed, ignited and pilled under extreme pressure to give physical stability. Beds of this catalyst are inserted in the converter at 3, 3a, etc., to give a thickness of approximately 4 inches in each and into this converter is passed, at a space velocity of approximately 9,900, a gaseous mixture containing 3% methyl hydroxy acetate and 97% hydrogen, preheated to approximately 200° C. The pressure on the hydrogen, as it enters the converter, is held at approximately 30 atmospheres and the temperature of the reaction mixture, between 210 and 215° C. As a result of the exothermicity of the reaction the temperature of the gaseous mixture, subsequent to the reaction in the catalyst bed 3 is raised, somewhat above the aforesaid temperatures, and in order to bring that temperature again within the range of 210 to 215° C., hydrogen, at approximately room temperature or below, if necessary, is injected through conduit 6. The hydrogen is injected in such amounts that the gaseous mixture passing from chamber 5 is at a temperature between approximately 210 and 215° C. and at this temperature is deflected by the stationary turbine blades 8 around the distribution plate 9 and into a second catalyst bed 3a, similar to the first disposed as shown in Figure 1.

While, ordinarily, it has been found that the same type of catalyst is employed in all of the catalyst beds, nevertheless, it will be appreciated that, for particular purposes, it might be advantageous to employ a different catalyst in one or more of the beds, the catalysts differing, for instance, because of the promoter employed or total composition, thereby giving a somewhat different reaction as to amount or kind in the various beds provided in the apparatus. It will be appreciated that, in an apparatus of this type, if all of the methyl hydroxy acetate is added through conduit 2 usually only a portion thereof will be hydrogenated to ethylene glycol in the uppermost bed 3 of the converter. As the gas passes downward, the unconverted ester becomes progressively smaller until as the product issues from the converter through conduit 13 substantially no unconverted ester remains.

It is to be understood that the converter illustrated is but an example of converters of similar construction wherein cold-shots or a continuous flow of hydrogen and/or inert gas can be admixed with the partially hydrogenated reaction mixture, in order to absorb, by the specific heat capacity of the injected hydrogen and/or inert gas, the excess heat resulting from the reaction which has already occurred. While the Figures 1 and 2 illustrate an apparatus wherein a plurality of catalyst layers are provided, a somewhat similar effect can be obtained in a converter containing a single catalyst bed, having relatively greater length than cross-section, the hydrogen being injected at various positions from the inlet to the exit portions of that bed. While such an apparatus would not perhaps give the precise control afforded by the apparatus illustrated, nevertheless, for many purposes acceptable results are obtained thereby.

The above description has emphasized particularly the removal of the heat of reaction and the concurrent accurate control of reaction temperature. This, however, is not the sole advantage derived from the use of the present process and converter but perhaps of more importance, particularly for the hydrogenation of organic compounds, and still more particularly for the hydrogenation of the hydroxy acetic acid esters to ethylene glycol, is the discovery that when the hydrogen is injected in a plurality of stages throughout a single catalyst bed or through a plurality of catalyst beds, catalyst poisoning and resulting loss in catalyst activity is greatly diminished, and in many instances, entirely eliminated.

It has been found that during catalytic vapor phase hydrogenation under superatmospheric pressures, particularly of hydroxy acetic acid esters to ethylene glycol, the reaction products or by-products of the reaction appear to be responsible for the degradation of the catalyst and this degradation is especially marked if there is condensation of the by-products or products of the hydrogenation on the catalyst. The cooling between stages may, of course, be accomplished by means of cooling coils provided in chambers 5, 5a, etc. By this means, however, condensation on the surfaces of the coils would be certain to result with contamination and degradation of the catalyst by the wet gases. While cooling the reactant gaseous mixture naturally lowers its dew point, nevertheless, cooling by introduction of hydrogen limits the dew point lowering because of the dilution effect of the hydrogen.

Furthermore, if high concentration of ester is present in the inlet gases and the process herein described permits the introduction of gas substantially saturated with the ester, maximum production will be favored per unit volume of catalyst. Owing to the fact that it is difficult to recover all ester from the reaction mixture in cyclical processes, high concentrations of the ester will generally be present. It is advantageous, therefore, from the standpoint of production and over-all operation of the process to employ high concentrations of the ester in the inlet gases. Subsequent injection of gases lowers the concentration of the products of hydrogenation favoring higher yields of glycol but preventing or decreasing reactions of the following type:

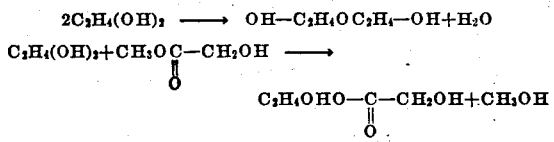

These considerations may not wholly explain what actually does occur as a result of the injection of hydrogen, in accord with the invention; nevertheless, its injection in stages does have the advantageous effect of inhibiting catalyst degradation, while reactions conducted without injections of hydrogen result in catalyst degradation, which increases in substantially a direct ratio to the depth of catalyst bed or number of beds through which the reactants pass.

Apparatus of this nature, and the process resulting from their use, can be employed with particular advantage for the hydrogenation of the hydroxy acetic acid esters at temperatures between 150 and 300° C. and pressures from 10 to 1000 atmospheres or higher. The esters of hydroxy acetic acid which may be thus hydrogenated include, generally, the hydroxy acetic acid esters of monohydric aliphatic alcohols such as methyl, ethyl, n-propyl, isopropyl, n-butyl, isobutyl, amyl, hexyl, octyl, decyl, and cetyl alcohol and include like esters of the branch chain alcohols containing three or more carbon atoms and produced, for example, along with methanol by catalytic pressure hydrogenation of carbon monoxide. The polyhydric alcohol esters, such as, for example, the glycol and glycerol esters and the aromatic alcohol esters, such as, phenyl glycolate may also be used. The lower alkyl esters of hydroxy acetic acid, namely, the methyl, ethyl, propyl, and butyl glycolates are especially adapted for hydrogenation by the process of this invention.

Generally speaking, hydrogenation catalysts which have been extensively described in the art may be used in converters of this type and for the hydrogenation of the hydroxy acetic acid esters the catalysts such as are described in the copending application of A. T. Larson, S. N. 171,894, filed October 30, 1937, and the hydrogenation catalysts described in the patent of W. A. Lazier, 2,094,611 may be used.

From a consideration of the above specification, it will be appreciated that many changes may be made in the details therein given without departing from the scope of the invention or sacrificing any of the advantages that may be derived therefrom.

I claim:

1. In a vapor phase process for the catalytic hydrogenation of alkyl esters of hydroxy acetic acid the steps which comprise reacting the alkyl ester of hydroxy acetic acid and hydrogen in a catalyst charged reaction zone and subsequently mixing the gases issuing therefrom with sufficient additional hydrogen to maintain the reaction products in the vapor phase to maintain the esters and hydrogenated products in the vapor phase and reacting the resulting mixture in another catalyst charged reaction zone.

2. In a vapor phase process for the catalytic hydrogenation of alkyl esters of hydroxy acetic acid the steps which comprise reacting a gaseous mixture of hydrogen, substantially saturated at reaction temperature with the alkyl ester of hydroxy acetic acid in a catalyst charged reaction zone and subsequently mixing the gases issuing therefrom with sufficient additional hydrogen to maintain the reaction products in the vapor phase to maintain the esters and hydrogenated products in the vapor phase and reacting the resulting mixture in another catalyst charged reaction zone.

3. In a vapor phase process for the catalytic hydrogenation of alkyl esters of hydroxy acetic acid, the steps which comprise passing the alkyl ester of hydroxy acetic acid and hydrogen into a reaction zone and subsequently reacting the partially hydrogenated reaction mixture with sufficient additional hydrogen to maintain the esters and hydrogenated products in the vapor phase in a second reaction zone to maintain the reaction products in the vapor phase.

4. In a vapor phase process for the catalytic hydrogenation of alkyl hydroxy acetates to ethylene glycol, the step which comprises adding relatively cold hydrogen to the reaction mixture after a portion of the alkl hydroxy acetate has reacted to ethylene glycol the cold hydrogen being added in sufficient amounts to maintain the ester and ethylene glycol present in the vapor phase and subsequently subjecting the resulting mixture to reaction conditions.

5. In a vapor phase process for the catalytic hydrogenation of an alkyl hydroxy acetate to ethylene glycol, the step which comprises passing a gaseous mixture of hydrogen substantially saturated with an alkyl hydroxy acetate into a catalyst charged reaction zone and subsequently reacting the partially hydrogenated reaction mixture with additional hydrogen in a second reaction zone in sufficient amounts to maintain the ester and ethylene glycol present in the vapor phase.

6. In a vapor phase process for the catalytic hydrogenation of methyl hydroxy acetate to ethylene glycol, the step which comprises adding hydrogen to the reaction mixture after a portion of the methyl hydroxy acetate has reacted to ethylene glycol, the hydrogen being added in sufficient amounts to maintain the ester and ethylene glycol present in the vapor phase, and subsequently subjecting the resulting mixture to reaction conditions.

7. In a vapor phase process for the catalytic hydrogenation of isobutyl hydroxy acetate to ethylene glycol, the step which comprises adding hydrogen to the reaction mixture after a portion of the methyl hydroxy acetate has reacted to ethylene glycol, the hydrogen being added in sufficient amounts to maintain the ester and ethylene glycol present in the vapor phase and subsequently subjecting the resulting mixture to reaction conditions.

8. In a vapor phase process for the catalytic hydrogenation of the alkyl esters of hydroxy acetic acid to ethylene glycol the steps which comprise passing hydrogen and the hydroxy acetic acid alkyl ester into a reaction zone and subsequently injecting hydrogen into the partially hydrogenated ester of hydroxy acetic acid in sufficient amounts to maintain the ester and ethylene glycol present in the vapor phase and finally substantially completing the hydrogenation of the ester by subjecting the resulting mixture to reaction conditions.

9. In a process for the preparation of ethylene glycol by the vapor phase catalytic hydrogenation of an alkyl hydroxy acetate the steps which comprises hydrogenating the alkl hydroxy acetate at a temperature between 150 and 300° C. and between 10 and 1000 atmospheres pressure by passing the hydrogen and the alkyl hydroxy acetate successively into a plurality of catalyst zones and injecting cold-shots of hydrogen between said zones in sufficient amounts to maintain the ester and ethylene glycol present in the vapor phase, whereby the temperature of the reaction is maintained within the desired temperature ranges and the disintegration of the catalyst is inhibited.

10. In a process for the preparation of ethylene glycol by the vapor phase catalytic hydrogenation of methyl hydroxy acetate the steps which comprise hydrogenating the methyl hydroxy acetate at a temperature between 150 and 300° C. and between 10 and 1000 atmospheres pressure, by passing the hydrogen and the methyl hydroxy acetate successively into a plurality of catalyst zones and injecting cold-shots of hydrogen between said zones in sufficient amounts to maintain the ester and ethylene glycol present in the vapor phase, whereby the temperature of the reaction is maintained within the desired temperature ranges and the disintegration of the catalyst is inhibited.

11. In a process for the preparation of ethylene glycol by the vapor phase catalytic hydrogenation of isobutyl hydroxy acetate the steps which comprise hydrogenating the isobutyl hydroxy acetate at a temperature between 150 and 300° C. and between 10 and 1000 atmospheres pressure by passing the hydrogen and the isobutyl hydroxy acetate successively into a plurality of catalyst zones and injecting cold-shots of hydrogen between said zones in sufficient amounts to maintain the ester and ethylene glycol present in the vapor phase, whereby the temperature of the reaction is maintained within the desired temperature ranges and the distintegration of the catalyst is inhibited.

FRED W. PARDEE, JR.